Oct. 4, 1966  R. B. MOSELY  3,277,191
TERMINAL ISOOLEFIN ISOMERIZATION AND SELECTIVE
HYDRATION TO TERTIARY ALCOHOL WITH INTERSTAGE
FRACTIONATION OF PARAFFIN
Filed March 22, 1963
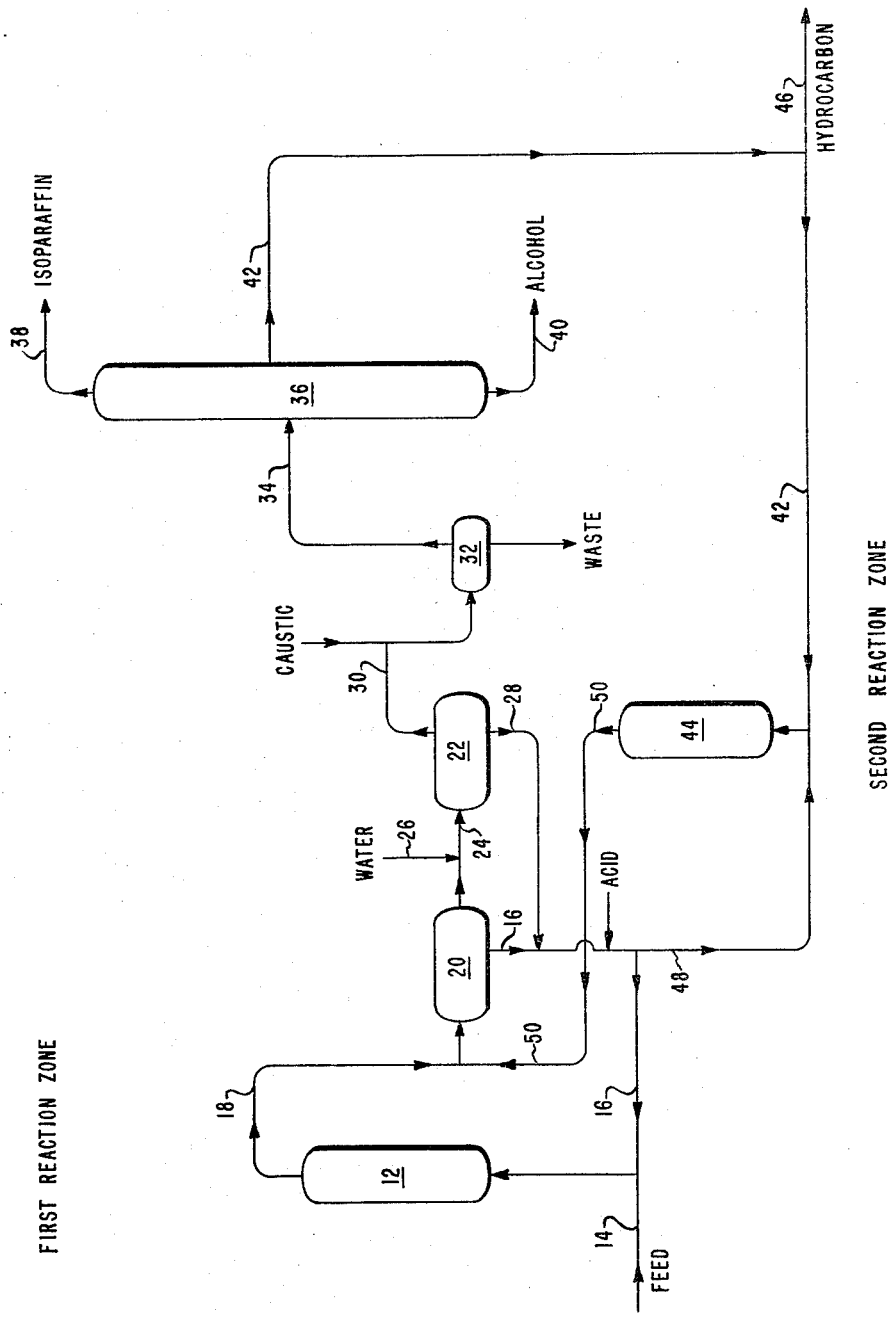
INVENTOR:
ROBERT B. MOSELY
BY: Robert C. Clement
HIS ATTORNEY

United States Patent Office 3,277,191
Patented Oct. 4, 1966

3,277,191
TERMINAL ISOOLEFIN ISOMERIZATION AND SELECTIVE HYDRATION TO TERTIARY ALCOHOL WITH INTERSTAGE FRACTIONATION OF PARAFFIN
Robert B. Mosely, Walnut Creek, Calif., assignor to Shell Oil Company, New York, N.Y., a corporation of Delaware
Filed Mar. 22, 1963, Ser. No. 267,291
7 Claims. (Cl. 260—641)

This invention relates to a process for converting iso-olefins into alcohols, and relates more particularly to the production of tertiary alcohols from a $C_5$ to $C_7$ fraction containing iso-olefin and isoparaffin.

The hydration of iso-olefin to produce tertiary alcohol is well known. The teritary alcohol is a superior blending component in modern gasoline because of its low sensitivity and high research and motor octane blending characteristics. It has been found that the conversion of iso-olefin to tertiary alcohol is very strongly dependent on iso-olefin concentration. When a substantially pure iso-olefin fraction is hydrated in the presence of a catalyst such as sulfuric acid, the resulting conversion of iso-olefin to tertiary alcohol is very attractive in a commercial sense. However, such a substantially pure iso-olefin fraction is generally not available in a refinery. The refinery hydrocarbon fraction also contains a mixture of normal paraffins, isoparaffins and normal olefins as well as the desirable iso-olefins. Thus, when a refinery hydrocarbon fraction, which contains normal paraffin, isoparaffin and/or normal olefin which act as diluents, is hydrated in the presence of a catalyst such as sulfuric acid, the resulting conversion of iso-olefin to tertiary alcohol is not sufficient to make the process economically attractive.

In accordance with the present invention, the concentration of suitable iso-olefins in a hydrocarbon fraction containing iso-olefin and isoparaffin hydrocarbons having from 5 to 7 carbon atoms is increased by staging the reaction and removing isoparaffin by distillation in an interstage fractionation tower. In the first reaction zone, terminal double bonded iso-olefins are isomerized to internal double-bonded iso-olefins. Isoparaffin is then removed from the iso-olefin fraction with minimum loss of valuable iso-olefin. The iso-olefin fraction, now substantially reduced in diluent content, is passed into a second reaction zone wherein the iso-olefin is hydrated to tertiary alcohol. This process results in greatly increased yields of tertiary alcohol. Additional advantages of this process will be apparent as the invention is described with reference to the drawing which shows a flow diagram of the invention.

As discussed before, conversion of iso-olefin to tertiary alcohol is very strongly dependent on iso-olefin concentration. And, any diluent such as normal paraffin, normal olefin, or isoparaffin which is in the feed adversely affects conversion. However, the isoparaffin cannot be separated from the feed by practical means such as fractional distillation without concomitant loss of certain valuable iso-olefins. For example, isopentane cannot be removed from the feed without concomitant loss of 2-methyl-1-butene, whereas isopentane can be separated from 2-methyl-2-butene. Thus, in the practice of the invention, 2-methyl-1-butene, a terminal double-bonded iso-olefin, is isomerized to 2-methyl-2-butene, an internal double-bonded iso-olefin, in a first reaction zone. Isopentane is then removed with minimum loss of the 2-methyl-1-butene which was not isomerized. Moreover, when the catalyst system in the first reaction zone also has hydration activity such as a sulfuric acid catalyst system, the acid isomerization of a terminal double-bonded iso-olefin, e.g., 2-methyl-1-butene, to an internal double-bonded iso-olefin, e.g., 2-methyl-2-butene, is faster than hydration. Thus, when the hydration of 2-methyl-1-butene to 2-methyl-2-butanol is only partly complete, the isomerization of 2-methyl-1-butene to 2-methyl-2-butene can be at equilibrium. Therefore, in a first hydration zone, a portion of the iso-olefin including a minor portion of a terminal double-bonded iso-olefin in converted to tertiary alcohol while the concomitant double-bond isomerization of the major portion of a terminal double-bonded iso-olefin to an internal double-bonded iso-olefin takes place.

The invention is broadly applicable to a hydrocarbon mixture containing iso-olefin and isoparaffin hydrocarbons having from 5 to 7 carbon atoms. It is particularly applicable to hydrocarbon fractions containing iso-olefin and isoparaffin hydrocarbons having from 5 to 7 carbon atoms obtained from the cracking of hydrocarbon oils.

In order to set forth more fully the nature of the invention, without however intending to limit the scope, the invention will be described in detail as applied to the selective hydration, under sulfuric acid conditions, of a $C_5$ to $C_7$ catalytically cracked fraction.

Iso-olefins are selectively hydrated with sulfuric acid of from about 40% w. to about 80% w. concentration, preferably from about 50% w. to about 70% w. concentration. The hydration temperature can be in the range of from about 0° C. to about 30° C., preferably from about 0° C. to about 20° C. The volumetric ratio of acid to hydrocarbon can be from about 1:3 to about 3:1, preferably about 1:1.

Referring now to the drawing: auxiliary equipment such as pumps, heat exchangers, valves, control mechanisms, etc., which are obvious to those skilled in the art are not shown. A $C_5$ to $C_7$ fraction containing iso-olefin and isoparaffin is introduced into first hydration zone 12 via line 14 wherein it is contacted with sulfuric acid added through line 16. The hydration zone consists of a reactor or reactors which can be of suitable design such as stirred reactors or can be of the tower reactor design with or without contacting means such as perforated trays. The hydration temperature is about 5° C. and the volumetric ratio of acid to hydrocarbon is about 1:1.

The first reaction zone effluent containing acid is withdrawn via line 18 from first hydration zone 12 and introduced into settler 20. Settled acid is withdrawn and recycled via line 16 to first reaction zone 12 and to a second hydration zone to be described hereafter. The reaction zone effluent containing alcohol, iso-olefin and some entrained acid is withdrawn from the settler and introduced into water-wash settler 22 through line 24. At the low hydration temperatures, the tertiary $C_6$ and heavier alcohols are soluble in the hydrocarbon phase while the majority of the tertiary $C_5$ alcohols initially produced remain in the acid phase. As the amount of tertiary alcohol builds up in the acid phase, more of the tertiary $C_5$ alcohols produced by iso-olefin hydration will be withdrawn in the hydrocarbon phase with, of course, the tertiary $C_6$ and heavier alcohols until equilibrium is obtained, when substantially all of the tertiary $C_5$ alcohols thereafter produced will be withdrawn in the hydrocarbon phase.

Water is introduced via line 26 into the water-wash settler. While it is not necessary in the practice of the invention, it is preferred to use only a minimum amount of water, usually the stoichiometric amount necessary to convert the olefin to alcohols, in order to minimize water handling and concomitant corrosion problems. It is desirable when using this small amount of water, to use multiple contacting stages for greater washing efficiency. When using only the stoichiometric amount for washing, the water, containing acid, is withdrawn via line 28, combined with the acid from settler 20, and recycled to the reaction zones. Sulfuric acid can be added to the system as necessary.

Reaction zone effluent is withdrawn from water wash settler 22 via line 30, given a caustic wash in vessel 32 to neutralize any entrained acid and introduced through line 34 into fractionation zone 36 wherein an alcohol fraction and an isopentane fraction are separated from a fraction containing unreacted iso-olefin. The isopentane fraction is recovered as an overhead product via line 38 and can be routed to gasoline storage as a high octane blending component. The alcohol fraction is withdrawn via line 40 as a bottom product and can be routed to gasoline storage as a high-octane, low-sensitivity blending component. A portion of the alcohol can be purified and routed to other storage for sales as chemicals, etc.

A hydrocarbon fraction enriched in isomerized as well as unreacted iso-olefin is withdrawn, as a side cut, from fractionator tower 36 via line 42 and is passed into second hydration zone 44. A portion of this fraction can be rejected, via line 46, as necessary to control the amount of diluents such as normal paraffin and normal olefin in this fraction. The rejected hydrocarbon fraction can be routed to further conversion processes such as hydroisomerization or alkylation. (Of course, the separation can be done using two distillation columns. In this situation, the isopentane fraction is recovered as an overhead product from the first column, the alcohol fraction is recovered as a bottom product from second column, and the iso-olefin fraction is recovered as an overhead product in the second column.)

Sulfuric acid is added to the second hydration zone through line 48. The hydration zone consists of one or more reactors of suitable design. The iso-olefins are selectively hydrated with sulfuric acid within the same concentration range as is used in the first reaction zone. The hydration temperature is also within the same range as in the first reaction zone, i.e., about 5° C. The volumetric ratio of acid to hydrocarbon is about 1:1. (Of course, different reaction conditions can be used in the second reaction zone.)

A hydrocarbon-acid mixture is withdrawn, via line 50, from the second hydration zone 44 and introduced into settler 20. While it is not necessary in the practice of the invention, it is preferred to use common settlers, wash and fractionation facilities for the two hydration zones.

The synthesis of alcohols by the hydration of olefins can likewise be carried out in other catalyst systems such as by contacting the olefin with water in the presence of an organic exchange material (of the sulfonated resin type, e.g., sulfonated polystyrene resin), a catalyst system comprising hydrogen fluoride and boron trifluoride, a supported phosphoric acid catalyst, oxides or sulfides of tungsten on a carrier, etc. The catalyst can be the same or different in the two reaction zones. For example, in a two catalyst system, a hydrocarbon fraction containing isoparaffin and iso-olefin is passed, with or without water, into a first reaction zone containing catalyst (such as a molecular sieve of the synthetic mordenite type, cracking catalysts, e.g., silica alumina, sulfonated polystyrene resins, etc.) which has activity for double-bond isomerization under conditions conducive to the selective isomerization of terminal double-bonded iso-olefins to internal double-bonded iso-olefins. An iso-olefin fraction is separated from isoparaffin in a fractionation zone and the fraction containing iso-olefin is passed into a second reaction zone wherein the iso-olefins are hydrated to tertiary alcohols.

The following examples are illustrative of some of the advantages derived from the invention, but are not to be considered to limit the scope of the invention.

*Example I*

A $C_5$ hydrocarbon fraction, obtained from catalytically cracking hydrocarbon oil and containing approximately 54% v. isopentane and 26% v. iso-olefin (including 11% v. 2-methyl-1-butene) is contacted, with sulfuric acid having a concentration of about 50° w., at 5° C. The ratio of acid to hydrocarbon is 1:1. The yield of iso-olefin in the feed to tertiary alcohol is approximately 8% v.

*Example II*

The $C_5$ hydrocarbon fraction, used in Example I, is prefractionated to remove isopentane. Substantially all of the 2-methyl-1-butene, which could be hydrated to tertiary alcohol, is removed from the hydration feed together with the isopentane. The fractionated feed, now containing a larger concentration of iso-olefin, is hydrated under conditions similar to Example I. The yield of iso-olefin to tertiary alcohol, basis iso-olefin in feed to prefractionator, is approximately 29% v.

*Example III*

The $C_5$ hydrocarbon fraction, used in Example I, is contacted in a first reaction zone, with sulfuric acid having a concentration of about 50% w., at 5° C. The volumetric ratio of acid to hydrocarbon is 1:1. The effluent hydrocarbon is water and caustic washed and then fractionated to separate the isopentane and alcohol. A hydrocarbon fraction, now enriched in concentration of iso-olefin (primarily 2-methyl-2-butene resulting from the isomerization of 2-methyl-1-butene and unreacted 2-methyl-2-butene) is obtained and is contacted in a second reaction zone under hydration conditions similar to the first reaction zone. The overall yield of iso-olefin to tertiary alcohol, basis iso-olefin in feed, is about 51%. Thus, the use of two reaction zones wherein 2-methyl-1-butene is isomerized to 2-methyl-2-butene in the first reaction zone, with interstage fractionation to remove isoparaffin, more than doubles the conversion of iso-olefin to tertiary alcohol and is also superior to a processing scheme involving prefractionation to remove the isoparaffin.

Similar benefits are realized, using the process of the invention, when processing a $C_6$ hydrocarbon fraction containing isohexane and iso-olefins such as 2-methyl-1-pentene. In this situation, the 2-methyl-1-pentene is isomerized, in the first reaction zone, to 2-methyl-2-pentene. The isohexane can thereafter be removed by fractionation with minimal loss of valuable iso-olefin.

I claim as my invention:

1. A process for the conversion of a hydrocarbon mixture containing isoparaffin and iso-olefin hydrocarbons having from 5 to 7 carbon atoms which comprises:
   (1) passing the mixture into a first reaction zone containing a catalyst having activity for double-bond isomerization under conditions conducive to the selective isomerization of terminal double-bonded iso-olefins to internal double-bonded iso-olefin;
   (2) passing the first reaction zone effluent into a fractionation zone to obtain an isoparaffin fraction and a fraction containing iso-olefin;
   (3) passing the fraction containing iso-olefin into a second reaction zone containing a hydration catalyst under conditions conducive to the selective hydration of iso-olefin to tertiary alcohol; and
   (4) recovering tertiary alcohol from the second reaction zone effluent.

2. A process for the conversion of a hydrocarbon fraction containing $C_5$ isoparaffin and iso-olefin hydrocarbons which comprises:
   (1) passing the fraction into a first reaction zone containing a catalyst having activity for double-bond isomerization under conditions conducive to the selective isomerization of terminal double-bonded iso-olefins to internal double-bonded isoolefins;
   (2) passing the first reaction zone effluent into a fractionation zone to obtain an isopentane fraction and a fraction containing isomerized and unreacted iso-olefins;
   (3) passing the fraction containing isomerized and unreacted iso-olefins into a second reaction zone containing a hydration catalyst under conditions conducive to the selective hydration of iso-olefin to tertiary alcohol; and
(4) recovering tertiary alcohol from the second reaction zone effluent.

3. The process according to claim 2 wherein the hydration catalyst is sulfuric acid having a concentration of from about 40% w. to about 80% w. and the hydration is effected at a temperature in the range of from about 0° C. to about 30° C.

4. A process for the conversion of a hydrocarbon fraction containing $C_6$ isoparaffin and iso-olefin hydrocarbons which comprises:
 (1) passing the fraction into a first reaction zone containing a catalyst having activity for double-bond isomerization under conditions conducive to the selective isomerization of terminal double-bonded iso-olefins to internal double-bonded isoolefins;
 (2) passing first reaction zone effluent to a fractionation zone to obtain an isohexane fraction, and a fraction containing isomerized and unreacted iso-olefins;
 (3) passing the fraction containing isomerized and unreacted iso-olefins into a second reaction zone containing a hydration catalyst under conditions conducive to the selective hydration of iso-olefin to tertiary alcohol; and
 (4) recovering tertiary alcohol from the second reaction zone effluent.

5. The process according to claim 4 wherein the hydration catalyst is sulfuric acid having a concentration of from about 40% w. to about 80% w. and the hydration is effected at a temperature in the range of from about 0° C. to about 30° C.

6. A process for the conversion of a catalytically cracked hydrocarbon fraction containing isoparaffin and isoolefin having from 5 to 7 carbon atoms which comprises:
 (1) contacting the hydrocarbon in a first reaction zone with sulfuric acid having a concentration of about 40% to about 80% w. at 0–30° C.;
 (2) fractionating effluent from the first reaction zone to obtain a first fraction comprising isoparaffin, a second fraction comprising internal isoolefin, and a third fraction comprising product alcohol;
 (3) contacting the second fraction from step (2) in a second reaction zone at 0° to 30° C. with sulfuric acid having a concentration of about 40% to about 80% w., thereby converting isoolefin to tertiary alcohol; and
 (4) recovering tertiary alcohol from effluent from the second reaction zone.

7. The process of claim 6 wherein the effluent from the second reaction zone is combined with effluent from the first reaction zone and tertiary alcohol produced in the second reaction zone is recovered in fractionation step (2).

References Cited by the Examiner

UNITED STATES PATENTS

| | | | |
|---|---|---|---|
| 2,093,426 | 9/1937 | Dreyfus | 260—641 |
| 2,118,882 | 5/1938 | Francis | 260—641 |
| 2,334,998 | 11/1943 | Draeger et al. | 260—683.2 |
| 2,952,719 | 9/1960 | Appell | 260—683.2 |
| 3,078,320 | 2/1963 | Toekelt | 260—683.2 |
| 3,173,968 | 3/1965 | Edwards et al. | 260—683.2 |
| 3,209,052 | 9/1965 | Scott et al. | 260—641 |

FOREIGN PATENTS

| | | |
|---|---|---|
| 143,393 | 9/1960 | U.S.S.R. |

LEON ZITVER, *Primary Examiner.*

M. B. ROBERTO, J. E. EVANS, *Assistant Examiners.*